(12) United States Patent
Klima et al.

(10) Patent No.: US 6,191,079 B1
(45) Date of Patent: Feb. 20, 2001

(54) LUBRICANTS FOR PAPER COATINGS

(75) Inventors: Rudolph Klima, Lansdale, PA (US);
John Krasniewski, Charlotte, NC (US);
Jose Maria Rodriguez, Ft. Mills, SC (US)

(73) Assignee: GEO Specialty Chemicals, Inc., Cleveland, OH (US)

( * ) Notice: Under 35 U.S.C. 154(b), the term of this patent shall be extended for 0 days.

(21) Appl. No.: 08/206,231

(22) Filed: Mar. 2, 1994

Related U.S. Application Data

(63) Continuation of application No. 07/941,021, filed on Sep. 4, 1992, now abandoned.

(51) Int. Cl.$^7$ .................................................. C10M 137/04
(52) U.S. Cl. ................... 508/431; 106/213; 106/287.24; 524/140
(58) Field of Search .............................. 106/213, 287.24; 524/140; 508/431

(56) References Cited

U.S. PATENT DOCUMENTS

| | | | |
|---|---|---|---|
| 2,723,237 | * 11/1955 | Ferrin ................................. | 252/49.8 |
| 3,000,824 | * 9/1961 | Morway et al. ..................... | 252/49.8 |
| 3,010,903 | * 11/1961 | Clarke et al. ....................... | 252/49.8 |
| 3,340,191 | * 9/1967 | White et al. ........................ | 252/49.8 |
| 3,470,270 | * 9/1969 | Wardi ................................. | 252/49.8 |
| 3,547,820 | * 12/1970 | Woodward et al. ................ | 252/49.8 |
| 3,984,340 | * 10/1976 | Sheratte .............................. | 252/49.8 |
| 4,183,766 | 1/1980 | Woodward ........................... | 106/213 |
| 4,612,128 | * 9/1986 | Uematsu et al. .................... | 252/49.8 |
| 4,673,439 | 6/1987 | Takahashi et al. .............. | 106/287.24 |
| 4,717,452 | * 1/1988 | Yoshioka et al. .................... | 162/158 |
| 4,758,359 | * 7/1988 | Kirk et al. ........................... | 252/49.8 |
| 4,766,015 | 8/1988 | Nikoloff et al. .................... | 427/326 |
| 4,810,301 | * 3/1989 | Yoshioka et al. .............. | 106/287.24 |
| 4,946,608 | * 8/1990 | Segaud ................................ | 252/49.8 |
| 5,062,979 | * 11/1991 | Scharf et al. ....................... | 252/49.8 |
| 5,185,393 | 2/1993 | Kanda et al. ........................ | 524/140 |

* cited by examiner

*Primary Examiner*—Jerry D. Johnson
(74) *Attorney, Agent, or Firm*—Rankin, Hill, Porter & Clark LLP

(57) ABSTRACT

A lubricant additive suitable for combination with an aqueous-based paper or paper board coating mixture wherein the lubricant additive is selected from the group consisting of a polyoxyalkylene mono- and di-ester of phosphoric acid, a polyoxyalkylene mono- and di-ester of a phosphoric acid salt, and a mixture thereof.

14 Claims, No Drawings

LUBRICANTS FOR PAPER COATINGS

This application is a continuation, of application Ser. No. 07/941,021 filed on Sep. 4, 1992 now abandoned.

BACKGROUND OF THE INVENTION

1. Field of the Invention

This invention relates to lubricant additives for coating moving paper and paper board web materials.

Paper and paper board web material is frequently coated to improve properties such as appearance and printability. The coating process involves applying a coating mixture to the paper as it moves at high speed through a coating apparatus. These coatings are typically composed of: (a) pigments, such as Kaolin clay, titanium dioxide, calcium carbonate or silicates; (2) adhesive binders, such as starches, styrene butadiene latex, or polyvinyl acetates; and (3) additives, which improve or modify specific properties and characteristics of the coating mixture.

A number of chemical phenomena and physical forces (particularly shear forces) can have a detrimental effect, e.g., destroying the integrity and uniformity of both the coating mixture and the coating as it is applied to the paper sheet. When this occurs, costly problems develop both in the application of the coating and in the finish and quality of the coated paper. These problems are widely known to manufacturers of coated papers.

These problems are greatly magnified as the speed of the web moving through the coating apparatus is increased, causing increased shear forces on the coating mixture being applied. Increased speed causes problems in viscosity control, calcification, streaking, whiskering, and generally poor "runnability" (performance) of the coating. These problems ultimately result in a poor quality coated sheet. Uniformity of the coating mix at these high shear levels is critical.

2. Discussion of Related Art

Typically, lubricant additives, such as calcium stearate dispersions or polyethylene emulsions, have been used as an additive to the coating mixture to improve the performance and uniformity of the coating and the overall integrity of the coating mixture. The main function of a lubricant additive in a coating mixture is to increase the lubricity of the coating. However, many other effects of lubricants are known to the art of coating paper. For example, such characteristics as rheological properties, plasticity, smoothness, coating gloss, anti-dusting and improved printing qualities, can be affected by the use of coating lubricants.

In U.S. Pat. No. 4,766,015 there is provided a lubricant additive mixture adapted for combination with an aqueous-based paper or paper board coating mixture. The additive mixture comprises a fatty acid, a surfactant, and a phospholipid composition such as a lecithin. Likewise, a paper coating composition is disclosed in U.S. Pat. No. 4,183,766 wherein the effectiveness of pigment coating compositions for printing paper stock is enhanced by the use of phosphate esters of aliphatic alcohols or their salts therein. However, there is a constant need for better or improved systems in paper coating color formulations.

DESCRIPTION OF THE INVENTION

Other than in the operating examples, or where otherwise indicated, all numbers expressing quantities of ingredients or reaction conditions used herein are to be understood as modified in all instances by the term "about".

It has now been found that polyoxyalkylene mono- and di-esters of phosphoric acid, and polyoxyalkylene mono- and di-esters of phosphoric acid salts significantly improve the properties of aqueous coatings for rapidly moving webs, such as paper webs.

In one aspect of this invention there is provided a method of applying an aqueous-based coating to a rapidly moving paper or paper board web wherein a lubricant additive comprising a polyoxyalkylene mono- or di-ester of phosphoric acid or a salt thereof is included in the coating mixture to be applied to the web. By aqueous-based is meant that the vehicle for the coating mixture is water or water and a water-miscible liquid.

The lubricant additive of this invention comprising a polyoxyalkylene mono- or di-ester or mixtures thereof of a phosphoric acid salt may have a structure according to the following formula 1 or formula 2

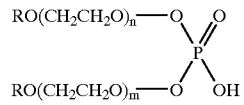

(1)

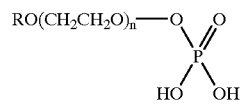

(2)

wherein R represents a hydrophobic tail such as an alkyl group, alkenyl group, aryl group, alkylaryl group, alkenyl aryl group, arylalkyl group, arylalkenyl group, or hydroxyalkyl group, n is an integer from about 1 to about 50, m is an integer from 0 to about 50, and n+m is preferably from about 1 to about 15.

The coating composition to be applied to the web may contain (1) pigments such as kaolin clay, calcium carbonate, titanium dioxide, etc., (2) binders such as starches, styrene butadiene rubber latexes, polyvinyl acetate latexes, and (3) other conventional additives in such compositions, including a nonionic, cationic and anionic surfactant.

The coating composition is applied to a paper or paper board web traveling at least 500 feet per minute, and generally much faster, for example, over 3500 feet per minute. In addition, a short-dwell application method may be employed, that is, a method wherein the coating composition is applied to the web under pressure while a device such as a doctor blade controls thickness of the coating composition. The coating composition preferably has a solids content of between about 50 and about 75% by weight, wherein the solids comprise on a weight basis, 8 to 12% binder, 80 to 90% pigment, and 0.5 to 1.5% lubricant additive selected from a polyoxyalkylene mono- and di-ester of phosphoric acid, and a polyoxyalkylene mono- and di-ester of phosphoric acid salt. To make the coating composition, a lubricant additive mixture containing 20 to 100% polyoxyalkylene mono- or di-ester or mixtures thereof of phosphoric acid or a salt thereof, 0 to 80% fatty acid or fatty acid salts, urea, molasses, corn syrup, ethoxylated glycerol or ethoxylated, propoxylated glycerol, and 0 to 3% emulsifier is provided and then mixed with a pigment-containing formulation. The coating composition may include a plasticizer such as a polyol, for example, a glycol, particularly dipropylene glycol.

The resulting coating composition enables a high solids content and can be used in high-speed paper coating equipment such as short-dwell equipment. The preferred coating composition contains clay pigment such as Kaolin clay, but other coatings may contain calcium carbonate, titanium dioxide, silica, zinc oxide, aluminum powder, synthetic polymers, talc, and diatomaceous earth.

In a further aspect of this invention, there is provided a lubricant additive suitable for combination with an aqueous-based paper or paper board coating composition, comprising a polyoxyalkylene mono- or di-ester or mixtures thereof of phosphoric acid, or a polyoxyalkylene mono- or di-ester or mixtures thereof of a phosphoric acid salt, a fatty acid, alkali metal salt of a fatty acid, or alkaline earth metal salt of a fatty acid, urea, molasses, corn syrup, ethoxylated glycerol, ethoxylated propoxylated glycerol and appropriate emulsifiers. The coating composition is preferably an aqueous slurry adapted for application to a rapidly moving web. The invention enables desirable Theological properties at high solid loading in the slurry, thus reducing the energy consumed to dry the liquid from the coated product. In addition, the invention maintains the smoothness and integrity of high-solid coatings, reducing unevenness or calcification. Specifically, the invention greatly improves the rheological properties and runnability of the wet coating at high speeds and in shear stress systems. In addition, this invention improves the characteristics of the dried coated paper.

This invention allows the use of coating mixtures in excess of 50% solids by weight. The lubricant can be supplied at 100% active ingredient level. This feature allows the coating formulator to prepare coating mixtures at desirable high solids levels and reduces the amount of water present in the mixture which must be subsequently dried after application.

This invention improves the runnability of the coating mixture in high speed coaters and good results have been obtained on many types of coating equipment. The coating additive contributes to the production of a high quality, uniformly coated web which possesses excellent finish and printing characteristics. Finally, the lubricant is adaptable to high speed technology and is generally compatible with coating mixture components.

Because of the generation of very high shear forces and hydraulic pressures encountered at the point of application of the coating mixture, it is important to control the rheological properties of the coating. These coating flow properties include viscosity, shear stability, elasticity and homogeneity. As machine speed is increased, the performance demands of the coating lubricant are then more critical.

It has been discovered that the application of the polyoxyalkylene mono- or di-ester or mixtures thereof of phosphoric acid or salt thereof greatly improves the uniformity and quality of the coating in both the wet and dry states. Its use greatly reduces streaking, formation of whiskers, and fish eyes. These terms are familiar to those experienced in the coating art.

It has been found that a polyoxyalkylene mono- or di-ester or mixtures thereof of phosphoric acid or salt thereof performs better than calcium stearate or a phospholipid such as lecithin with respect to dry state properties such as gloss, brightness, opacity and Parker Print Surface smoothness. No streaking was observed, and since the lubricant is a liquid, blade wear problems are minimized.

Dusting

Laboratory work by the Applicants indicates that two types of dusting can occur. Low adhesive binder rotogravure colors containing greater synthetic to natural binder ratios dust to a much greater degree than offset colors which contain higher natural to synthetic binder ratios. Rotogravure dusting is observed to be a thick sticky film left behind on the supercalender roll. Particles which have been picked off the paper are clearly visible on the roll, which is a white film after calendering the sheet. Offset dusting is electrostatic attraction of the sheet to the roll. In fact, the static electricity has been observed to be analogous to the static attraction of hair to a metal comb. This type of attraction can always occur when a conductor is rubbed with a nonconducting but charging (like a capacitor) material. No build-up or film on the roll can be observed when an offset color is calendared, however the sheet sticks and requires force to be pulled off the roll. The antistatic properties of an ethoxylated phosphate lubricant were found to significantly reduce the attraction of the offset coated sheet for the supercalendared roll.

The following examples further illlustrate this invention, but are not meant to be any limitation thereof.

EXAMPLE I

This example illustrates the synthesis of a lubricant material in accordance with this invention. A charge of ethoxylated alcohol containing n moles of ethylene oxide, where n=4.0 was added to a 4 necked flask. The contents of the flask was stirred and heated to 60° C. One neck was fitted with a thermometer, the second held a stirrer, a nitrogen gas purge was used in the third neck and the fourth neck was used as a port to add reactant. Poly phosphoric acid heated to 100° C. was added to the reaction flask containing the ethoxylated alcohol as fast as possible, while controlling the exotherm at 60° C. The optimum reactant ratio of ethoxylated alcohol to poly phosphoric acid is 1.5:1.0. The mixture was heated to 100° C. for 3 hours. The liquid turned from a white milky color to a translucent tan color characteristic of phosphorylated materials. The reaction product was an ethoxylated alkyl phosphate with a mono to di-ester weight ratio of 70% to 5% containing 25% free phosphoric acid. The phosphorylated ethoxylated alcohols were then added to a paper coating color mixture at a level of 0.2%/wt to 5%/wt based on pigment solids.

The polyoxyalkylene phosphates can be converted into their neutral salt form by acid base neutralization using either sodium hydroxide (NaOH), potassium hydroxide (KOH) or calcium hydroxide $(Ca(OH)_2)$.

EXAMPLE II

Laboratory Gloss Investigation

The ethoxylated decyl phosphate material synthesized in example I was compared to calcium stearate in an offset coating color formulation at the same dosage level (1 part per 100 parts clay). Draw-downs were made, dried and supercalendared. The following gloss results were obtained for the same coat weight.

| Lubricant | Gloss |
|---|---|
| Blank (no lubricant) | 60.16 |
| Calcium stearate | 64.81 |
| Ethoxylated decyl phosphate | 66.18 |

The color-containing ethoxylated decyl phosphate formulation showed no adherence to the supercalender roll, while the blank and the calcium stearate containing color formulation did.

It was determined that for the ethoxylated decyl phosphate used in this study, ethoxylation accounts for 39% of the molecule's weight. The degree of ethoxylation calculated from this result indicates that the ethoxylated decyl phosphate contains about 3.5 moles of ethylene oxide.

EXAMPLE III

The ethoxylated decyl phosphate lubricant used in Example II was coated on a high speed cylindrical laboratory coater and dry state tested versus calcium stearate at the same dosage (1 part solids per 100 parts clay). The following results were obtained.

| Lub. | Coat Weight | Dry State Properties | | | |
|---|---|---|---|---|---|
| | | Gloss per unit Coat Weight | PPS Smoothness per unit Coat Weight | Brite per unit Coat Weight | Opacity per unit Coat Weight |
| CaSt$_2$ | 4.3 | 10.41 | 0.63 | 15.25 | 17.79 |
| | 5.3 | 9.69 | 0.49 | 12.71 | 14.67 |
| | 6.3 | 8.00 | 0.34 | 9.73 | 11.35 |
| EO | 4.0 | 12.25 | 0.59 | 16.25 | 18.95 |
| dec | 5.3 | 10.07 | 0.43 | 12.39 | 14.47 |
| Phos | 6.3 | 9.09 | 0.36 | 10.50 | 12.08 |

| | Wet State Properties | | |
|---|---|---|---|
| Lub. | Coat weight | Blade Run-In | Streaking |
| CaSt$_2$ | 4.3 | .0255 | none |
| | 5.2 | .0235 | none |
| | 6.8 | .021 | none |
| EO Dec | 4.0 | .033 | none |
| Phos | 5.3 | .030 | none |
| | 6.3 | .027 | none |

In the above table, Lub. stands for lubricant, CaSt$_2$ stands for calcium stearate, EO dec Phos stands for ethoxylated decyl phosphate, and PPS stands for Parker Print Surface.

In general, the dry state properties for the ethoxylated decyl phosphate lubricant were equivalent or superior to those of CaSt$_2$. No streaking was observed for the ethoxylated decyl phosphate lubricant or the CaSt$_2$ lubricant. While the blade run-in was slightly higher for the ethoxylated decyl phosphate compared to CaSt$_2$ at very low coat weights, the differences in blade run-in at typical LWC coat weights are insignificant. In summary, the new liquid ethoxylated phosphate lubricant was found to be equivalent or superior to calcium stearate in dry state properties and equivalent to calcium stearate in wet state properties.

EXAMPLE IV

The calcium salt of a tridecyl alcohol wherein n was equal to 6, i.e., containing 6 moles of ethylene oxide, and comprising 60% diester and 40% monoester of phosphoric acid was evaluated with a high speed cylindrical laboratory coater with the following results, compared to calcium stearate as a standard.

| Lubricant | Coat Weight | Run-In | Brightness | Opacity | Gloss |
|---|---|---|---|---|---|
| Ca salt of alkoxylated H$_3$PO$_4$ esters | 4.3 | 0.0365 | 65.8 | 78.0 | 49.8 |
| | 5.5 | 0.0310 | 66.7 | 76.8 | 52.5 |
| | 6.7 | 0.0255 | 66.9 | 78.1 | 59.2 |
| Calcium Stearate | 4.3 | 0.0255 | 65.5 | 76.1 | 44.8 |
| | 5.2 | 0.0235 | 66.1 | 76.3 | 50.1 |
| | 6.8 | 0.0210 | 66.2 | 77.2 | 54.4 |

No streaking was observed.

What is claimed is:

1. An aqueous-based paper or paper board coating composition consisting essentially of a pigment, a binder, and a lubricant additive selected from the group consisting of a polyoxyalkylene mono- and di-ester of phosphoric acid, a polyoxyalkylene mono- and di-ester of a phosphoric acid salt, and a mixture thereof.

2. A coating composition as in claim 1 wherein said pigment is selected from the group consisting of clay, titanium dioxide, and calcium carbonate.

3. A coating composition as in claim 1 wherein said binder is selected from the group consisting of starch, styrene-butadiene-rubber, and polyvinyl acetate.

4. A coating composition as in claim 1 having a solids content of from about 50 to about 75% by weight, comprising from about 8 to about 12% by weight of said binder, from about 80 to about 90% by weight of said pigment, and from about 0.5 to about 1.5% by weight of said lubricant additive, based on the weight of said solids.

5. A coating composition as in claim 1 further containing a plasticizer.

6. A coating composition as in claim 5 wherein said plasticizer comprises a glycol.

7. A coating composition as in claim 1 wherein said lubricant additive has a structure according to formula 1 or formula 2

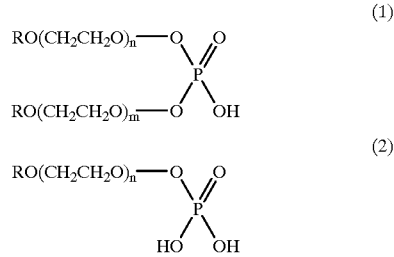

wherein R represents an alkyl group, alkenyl group, aryl group, alkyl aryl group, alkenyl aryl group, arylalkyl group, aryl alkenyl group, and hydroxyalkyl group, and n is an integer from about 1 to about 50, m is an integer from 0 to about 50, and n+m is preferably from about 1 to about 15.

8. The process of applying an aqueous-based coating composition consisting essentially of a pigment and a binder to a rapidly moving paper or paper board web consisting of contacting said web with a lubricant additive selected from the group consisting of a polyoxyalkylene mono- and di-ester of phosphoric acid, a polyoxyalkylene mono- and di-ester of a phosphoric acid salt, and a mixture thereof.

9. A process as in claim 8 wherein said pigment is selected from the group consisting of clay, titanium dioxide, and calcium carbonate.

10. A process as in claim 8 wherein said binder is selected from the group consisting of starch, styrene-butadiene-rubber, and polyvinyl acetate.

11. A process as in claim 8 wherein said coating composition has a solids content of from about 50 to about 75% by weight, and comprises from, about 8 to about 12% by weight of a binder, from about 80 to about 90% by weight of a pigment, and from about 0.5 to about 1.5% by weight of said lubricant additive, based on the weight of said solids.

12. A process as in claim 8 wherein said coating composition further contains a fatty acid, a metal salt of a fatty acid, or a mixture thereof.

13. A process as in claim 8 wherein said coating composition further contains an emulsifier.

14. A process as in claim 8 wherein said lubricant additive has a structure according to formula 1 or formula 2

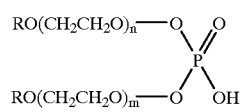
(1)

-continued

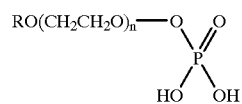
(2)

wherein R represents an alkyl group, alkenyl group, aryl group, alkyl aryl group, alkenyl aryl group, aryl alkyl group, aryl alkenyl group, and hydroxyalkyl group, and n is an integer from about 1 to about 50, m is an integer from 0 to about 50, and n+m is preferably from about 1 to about 15.

* * * * *